United States Patent
Nishiguchi et al.

(10) Patent No.: US 10,698,335 B2
(45) Date of Patent: Jun. 30, 2020

(54) OPTICAL SCANNING APPARATUS AND IMAGE FORMING APPARATUS

(71) Applicant: CANON KABUSHIKI KAISHA, Tokyo (JP)

(72) Inventors: Tetsuya Nishiguchi, Tagata-gun (JP); Hiroyuki Fukuhara, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/411,578

(22) Filed: May 14, 2019

(65) Prior Publication Data
US 2019/0265608 A1    Aug. 29, 2019

Related U.S. Application Data

(63) Continuation of application No. PCT/JP2017/041213, filed on Nov. 16, 2017.

(30) Foreign Application Priority Data

Nov. 17, 2016  (JP) .................................. 2016-223899
Nov. 6, 2017   (JP) .................................. 2017-213548

(51) Int. Cl.
*G03G 15/04*   (2006.01)
*G02B 5/09*    (2006.01)
(Continued)

(52) U.S. Cl.
CPC ......... *G03G 15/04072* (2013.01); *G02B 5/09* (2013.01); *G02B 26/127* (2013.01); *G03G 15/043* (2013.01); *G03G 15/55* (2013.01)

(58) Field of Classification Search
CPC ........... G03G 15/04072; G03G 15/043; G03G 15/04036; G02B 26/127
See application file for complete search history.

(56) References Cited

U.S. PATENT DOCUMENTS 9,128,291 B2    9/2015  Nagatoshi et al. ......................... G03G 21/1666
9,523,851 B2   12/2016  Nakamura et al. ..  G02B 26/121
(Continued)

FOREIGN PATENT DOCUMENTS

JP   H02-118612    5/1990
JP   2004-240275   8/2004
(Continued)

OTHER PUBLICATIONS

International Preliminary Report on Patentability (IPRP) and Written Opinion dated May 31, 2019 in counterpart PCT/JP2017/041213 with English translation.

*Primary Examiner* — Carla J Therrien
(74) *Attorney, Agent, or Firm* — Venable LLP

(57) ABSTRACT

An optical scanning apparatus, including: a detector configured to detect a writing start position of a light beam emitted from a light source and reflected by a rotary polygon mirror; and a control circuit board electrically connected to the light source, wherein the detector is fixed to the control circuit board, the control circuit board includes a first connection portion at which the light source is connected to the control circuit board and a second connection portion through which the control circuit board and an exterior are electrically connected, the control circuit board is fixed to an optical box by a fixing unit, and the fixing unit is arranged, between the first connection portion and the second connection portion, on a second straight line orthogonal to a first straight line connecting the light source and the detector, so as to be closer to the detector than to the light source.

9 Claims, 10 Drawing Sheets

(51) Int. Cl.
   *G02B 26/12* (2006.01)
   *G03G 15/043* (2006.01)
   *G03G 15/00* (2006.01)

(56) References Cited

U.S. PATENT DOCUMENTS

| | | | |
|---|---|---|---|
| 9,581,929 B2 | 2/2017 | Nagatoshi et al. | ........................... G03G 21/1666 |
| 9,658,562 B2 | 5/2017 | Watanabe et al. | ... G03G 15/043 |
| 9,854,120 B2 | 12/2017 | Tanaka et al. | ..... H04N 1/00519 |
| 9,864,934 B2 | 1/2018 | Kobayashi et al. | ........................... G06K 15/1219 |
| 10,078,288 B2 | 9/2018 | Fukuhara | ............. G03G 15/043 |
| 10,274,858 B2 | 4/2019 | Fukuhara | ......... G03G 15/04036 |
| 2006/0045149 A1 | 3/2006 | Kasai | .............................. 372/24 |
| 2009/0052944 A1* | 2/2009 | Kubo | ....................... B41J 2/473 399/220 |
| 2009/0060583 A1* | 3/2009 | Amada | ................... B41J 2/473 399/221 |
| 2011/0304681 A1* | 12/2011 | Okazaki | ............... G03G 15/326 347/224 |
| 2013/0033557 A1 | 2/2013 | Lim et al. | ...................... 347/224 |
| 2013/0147890 A1* | 6/2013 | Sawamoto | ........... G03G 15/043 347/118 |
| 2013/0155166 A1* | 6/2013 | Watanabe | ............ G02B 26/123 347/224 |
| 2013/0286134 A1* | 10/2013 | Yamazaki | ............ G03G 15/043 347/118 |
| 2016/0170325 A1* | 6/2016 | Nagashima | .......... G01N 21/474 399/74 |
| 2018/0143559 A1* | 5/2018 | Omura | ............ G03G 15/0189 |

FOREIGN PATENT DOCUMENTS

| | | |
|---|---|---|
| JP | 2006-065012 | 3/2006 |
| JP | 2009-271438 | 11/2009 |
| JP | 2013-238701 | 11/2013 |
| JP | 2015-011160 | 1/2015 |

* cited by examiner

OPTICAL SCANNING APPARATUS AND IMAGE FORMING APPARATUS

CROSS-REFERENCE TO RELATED APPLICATIONS

This application is a Continuation of International Patent Application No. PCT/JP2017/041213, filed Nov. 16, 2017, which claims the benefit of Japanese Patent Application No. 2016-223899, filed Nov. 17, 2016, and Japanese Patent Application No. 2017-213548, filed Nov. 6, 2017, all of which are hereby incorporated by reference herein in their entirety.

BACKGROUND OF THE INVENTION

Field of the Invention

The present invention relates to an optical scanning apparatus to be used for an image forming apparatus such as a copying machine, a printer, and a facsimile machine.

Description of the Related Art

An optical scanning apparatus to be used for an image forming apparatus such as a copying machine, a printer, and a facsimile machine optically modulates a laser light beam emitted from a light source in accordance with an image signal. The optically modulated laser light beam is deflected and scanned by a light deflector formed of, for example, a rotary polygon mirror. The deflected and scanned laser light beam is imaged on a surface of a photosensitive drum through a scanning lens such as an fθ lens to form an electrostatic latent image. Subsequently, a developer is supplied to the electrostatic latent image, which is formed on the surface of the photosensitive drum, by a developing device to develop the electrostatic latent image into a visible toner image. The toner image is transferred onto a recording material such as a paper sheet. Then, the recording material bearing the toner image is conveyed to a fixing device, and the toner image on the recording material is heated and fixed by the fixing device. In this manner, printing is performed.

In the optical scanning apparatus, the laser light beam emitted from the light source is deflected and scanned by the light deflector formed of the rotary polygon mirror. At the time of deflection and scanning, an image writing start position with the laser light beam reflected on a reflecting surface of the rotary polygon mirror is controlled. For the control of the writing start position, the optical scanning apparatus includes a control circuit board on which a beam detect (BD) sensor is mounted. The BD sensor is configured to receive the laser light beam to generate a horizontal synchronization signal. The control circuit board is connected to the light source. In Japanese Patent Application Laid-Open No. 2009-271438 and Japanese Patent Application Laid-Open No. H02-118612, the control circuit board is fixed onto an outer wall of an optical box of the optical scanning apparatus with screws.

However, in Japanese Patent Application Laid-Open No. 2009-271438 and Japanese Patent Application Laid-Open No. H02-118612, there are the following problems. In general, electronic components on the control circuit board are soldered through reflow soldering. The reflow soldering is soldering which involves a process of applying solder in advance at a normal temperature and then heating and melting the solder. The control circuit board is sometimes warped by heat generated at the time of reflow soldering.

Further, when the control circuit board is fixed onto the optical box, the control circuit board is sometimes warped depending on seat accuracy of a fixing seat.

The control circuit board on which the BD sensor is mounted is fixed onto the optical box with the screws. A fixed point of the control circuit board is located at a position away from the BD sensor. Under an influence of the warp of the control circuit board, a position of the BD sensor is shifted in a warping direction. When the position of the BD sensor is shifted in the warping direction, timing at which the horizontal synchronization signal for controlling the image writing start position is generated is affected by the warp to be sometimes advanced or delayed.

SUMMARY OF THE INVENTION

The present invention has been made to solve the problems described above.

According to an exemplary embodiment, an optical scanning apparatus, comprises:

a light source;

a deflector including a rotary polygon mirror configured to deflect and scan a light beam emitted from the light source;

a detector configured to detect a writing start position of the light beam reflected by the rotary polygon mirror;

a control circuit board electrically connected to the light source; and an optical box configured to contain the deflector, wherein the detector is fixed to the control circuit board, wherein the control circuit board includes a first connection portion at which the light source is connected to the control circuit board and a second connection portion through which the control circuit board and an exterior are electrically connected, and the control circuit board is fixed to the optical box by a fixing unit, and wherein the fixing unit is arranged between the first connection portion and the second connection portion, is arranged on a second straight line orthogonal to a first straight line connecting the light source and the detector, and is arranged so as to be closer to the detector than to the light source.

Further features of the present invention will become apparent from the following description of exemplary embodiments with reference to the attached drawings.

DESCRIPTION OF THE EMBODIMENTS

An embodiments of an image forming apparatus including an optical scanning apparatus according to the present invention will specifically be described with reference to the drawings.

First Embodiment

A configuration of an image forming apparatus including an optical scanning apparatus according to a first embodiment of the present invention is described with reference to FIG. 1 to FIG. 8B.

<Image Forming Apparatus>

Figure 1:
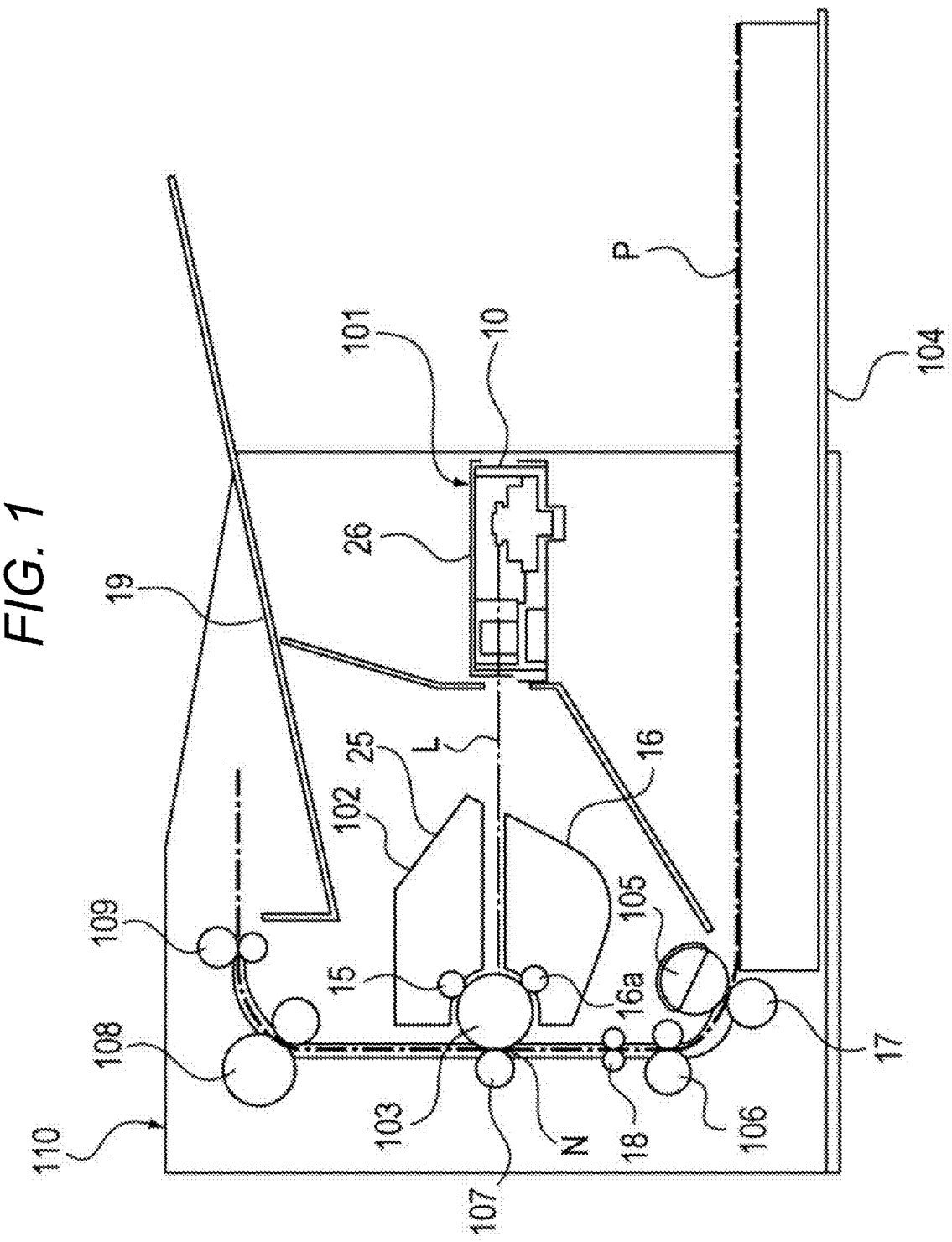
FIG. 1 is an explanatory sectional view for illustrating a configuration of an image forming apparatus including an optical scanning apparatus according to the present invention.

First, a configuration of the image forming apparatus including the optical scanning apparatus according to the present invention is described with reference to FIG. 1. FIG. 1 is an explanatory sectional view for illustrating a configuration of the image forming apparatus including an optical scanning apparatus 101 according to the present invention. An image forming apparatus 110 illustrated in FIG. 1 corresponds to an example of an electrophotographic laser printer. The image forming apparatus 110 illustrated in FIG. 1 includes the optical scanning apparatus 101. The image forming apparatus 110 includes an image forming unit. The image forming unit is configured to form an image on a recording material P based on an image formed through light exposure and scanning by the optical scanning apparatus 101 on a surface of a photosensitive drum 103 serving as an image bearing member. The surface of the photosensitive drum 103 is exposed to and scanned by a laser light beam L (light beam) emitted from the optical scanning apparatus 101, thereby forming an electrostatic latent image on the surface of the photosensitive drum 103.

In the image forming apparatus 110 illustrated in FIG. 1, the laser light beam L based on obtained image information is emitted by the optical scanning apparatus 101 serving as an exposure unit and is then radiated onto the surface of the photosensitive drum 103 serving as the image bearing member built in a process cartridge 102. The photosensitive drum 103, a charging roller 15, a developing device 16, and a cleaner 25 are provided integrally in the process cartridge 102. The charging roller 15 serves as a charging unit corresponding to an image forming process unit configured to act on the photosensitive drum 103. The developing device 16 serves as a developing unit. The cleaner 25 serves as a cleaning unit. The process cartridge 102 is removably provided to a main body of the image forming apparatus 110.

The surface of the photosensitive drum 103 serving as the image bearing member, which is rotated in a clockwise direction in FIG. 1, is uniformly charged by the charging roller 15 serving as the charging unit. The thus uniformly charged surface of the photosensitive drum 103 is exposed to and scanned with the laser light beam L in accordance with the image information by the optical scanning apparatus 101. As a result, the electrostatic latent image in accordance with the image information is formed on the surface of the photosensitive drum 103. A developer is supplied to the electrostatic latent image formed on the surface of the photosensitive drum 103 with use of a developing roller 16a, thereby developing the electrostatic latent image as a toner image. The developing roller 16a is provided to the developing device 16 serving as the developing unit, and serves as a developer bearing member.

Meanwhile, the recording materials P stored in a feed cassette 104 are fed by a feed roller 105, and are separated and fed one by one by the feed roller 105 in cooperation with a separation roller 17. Further, the recording material P is nipped and conveyed between conveyance rollers 106. Then, a leading edge of the recording material P is brought into abutment against a nip portion between registration rollers 18 in a stopped state. A skew feed of the recording material P is corrected by the strength in stiffness of the recording material P.

In synchronization with timing at which the toner image formed on the surface of the photosensitive drum 103 reaches a transfer nip portion N formed between the surface of the photosensitive drum 103 and a transfer roller 107 serving as a transfer unit, the registration rollers 18 are rotated. As a result, the recording material P is nipped between the registration rollers 18 to be conveyed to the transfer nip portion N. A transfer bias voltage is applied to the transfer roller 107 by a transfer bias power supply (not shown) to transfer the toner image formed on the surface of the photosensitive drum 103 onto the recording material P. A residual toner remaining on the surface of the photosensitive drum 103 after the transfer is removed by the cleaner 25 so as to be collected.

The recording material P having the unfixed toner image formed thereon is nipped between the photosensitive drum 103 and the transfer roller 107 to be conveyed to a fixing device 108 serving as a fixation portion. Through a process in which the recording material P is nipped and conveyed between a fixing roller and a pressurizing roller provided to the fixing device 108, the toner image is heated and pressurized. As a result, the toner image is thermally fused to be thermally fixed onto the recording material P. The recording material P nipped and conveyed between the fixing roller and the pressurizing roller of the fixing device 108 is delivered by delivery rollers 109 onto a delivery tray 19 provided outside the image forming apparatus 110.

In this embodiment, the charging roller 15 serving as the charging unit and the developing device 16 serving as the developing unit are provided integrally with the photosensitive drum 103 inside the process cartridge 102. The charging unit and the developing unit correspond to the image forming process unit for acting on the photosensitive drum 103. Besides, each of the image forming process unit can be configured independently of the photosensitive drum 103.

<Optical Scanning Apparatus>

Figure 2:
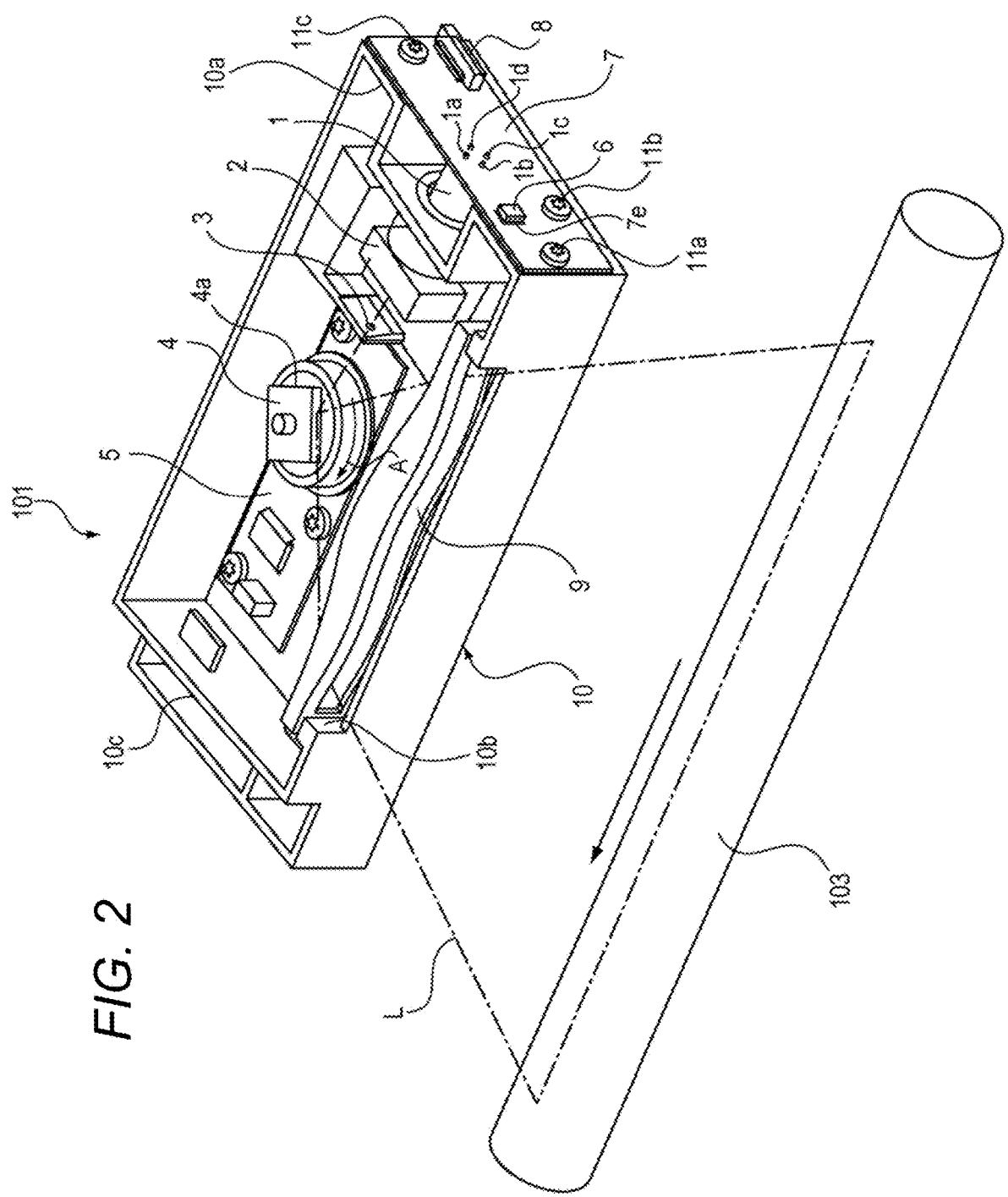
FIG. 2 is an explanatory perspective view for illustrating a configuration of the optical scanning apparatus according to the present invention.

Next, a Configuration of the Optical Scanning Apparatus 101 is Described with reference to FIG. 2. FIG. 2 is an explanatory perspective view for illustrating a configuration of the optical scanning apparatus 101 according to the present invention. In FIG. 2, a semiconductor laser unit 1 is a light source configured to emit the laser light beam L. An anamorphic collimation lens 2 is obtained by integrally forming a collimation lens and a cylindrical lens. An aperture 3 is an optical diaphragm configured to shape the laser light beam L into a predetermined shape. A deflector 5 is configured to rotationally drive a rotary polygon mirror 4. The deflector 5 includes the rotary polygon mirror 4 configured to deflect the laser light beam L (light beam) emitted from the semiconductor laser unit 1 (light source).

A beam detect (BD) sensor 6 is a detector configured to detect a writing start position with the laser light beam L (light beam) reflected by the rotary polygon mirror 4. A control circuit board 7 is electrically connected to the semiconductor laser unit 1 (light source). A signal transmission connector 8 is provided onto the control circuit board 7. An fθ lens 9 is a scanning lens. The fθ lens 9 has the following lens characteristic (fθ characteristic). When the laser light beam L is incident on the fθ lens 9 at an angle θ, the fθ lens 9 focuses the laser light beam L to form an image having a size of (f×θ) obtained by multiplying the angle θ with a focal length "f" of the fθ lens 9.

An optical box 10 is configured to accommodate the semiconductor laser unit 1 (light source), the anamorphic collimation lens 2, the aperture 3, the rotary polygon mirror 4, the deflector 5 configured to rotationally drive the rotary polygon mirror 4, and the fθ lens 9. An opening 10c formed on an upper side of the optical box 10 is covered with a lid member 26 illustrated in FIG. 1. Fixing screws 11a, 11b, and 11c are fixing units configured to fix the control circuit board 7 to fixing seats 13a, 13b, and 13c. The fixing seats 13a to 13c are provided onto an outer surface of a side wall 10a of the optical box 10.

In the optical scanning apparatus 101 illustrated in FIG. 2, the laser light beam L is emitted from the semiconductor laser unit 1 in accordance with an image signal received through the signal transmission connector 8 provided onto the control circuit board 7. The laser light beam L is converted into parallel light or weak convergent light in a main scanning direction (axial direction of the photosensitive drum 103) through the anamorphic collimation lens 2. In a sub-scanning direction (circumferential direction of the photosensitive drum 103), the laser light beam L is converted into convergent light.

After that, the laser light beam L is shaped into the predetermined shape through the aperture 3 corresponding to a through hole. Then, the laser light beam L is imaged into a focal line shape extending in an elongated manner in the main scanning direction (axial direction of the photosensitive drum 103) on a reflecting surface 4a of the rotary polygon mirror 4. The laser light beam L imaged on the reflecting surface 4a of the rotary polygon mirror 4 is deflected by rotating the rotary polygon mirror 4 in a direction indicated by the arrow A of FIG. 2.

The laser light beam L deflected by the rotary polygon mirror 4 is incident on a light-receiving surface 61 of the BD sensor 6 mounted on the control circuit board 7. At this time, the BD sensor 6 detects the writing start position with the laser light beam L in the main scanning direction and outputs a beam detect (BD) signal in accordance with the timing of detection. The BD signal serves as a trigger signal for control for registration of the writing start positions in the main scanning direction.

When the rotary polygon mirror 4 is further rotated in the direction indicated by the arrow A of FIG. 2, the laser light beam L deflected and scanned by the rotary polygon mirror 4 is incident on the fθ lens 9. The fθ lens 9 is designed to converge the laser light beam L so as to form a spot on the surface of the photosensitive drum 103 and keep a scanning speed of the spot at a constant speed. In order to obtain the above-mentioned characteristic of the fθ lens 9, the fθ lens 9 is formed of an aspherical lens.

After passing through the fθ lens 9, the laser light beam L is emitted from an opening 10b of the optical box 10 to be imaged and scanned on the surface of the photosensitive drum 103. The control circuit board 7 is fixed onto the outer surface of the side wall 10a of the optical box 10 with use of the fixing screws 11a, 11b, and 11c. The opening 10c on the upper side of the optical box 10 is covered with the lid member 26 illustrated in FIG. 1.

The rotary polygon mirror 4 is rotated in the direction indicated by the arrow A of FIG. 2 to deflect the laser light beam L. The rotary polygon mirror 4 scans the laser light beam L on the surface of the photosensitive drum 103 uniformly charged by the charging roller 15 in the main scanning direction (axial direction of the photosensitive drum 103) to expose the surface of the photosensitive drum 103 to light. Further, the photosensitive drum 103 is rotationally driven in the clockwise direction of FIG. 1 to perform exposure to light in the sub-scanning direction (circumferential direction of the photosensitive drum 103). In this manner, the electrostatic latent image in accordance with the image information is formed on the surface of the photosensitive drum 103.

<Positional Relationship Among Control Circuit Board, BD Sensor, and Fixing Screws>

Figure 3:
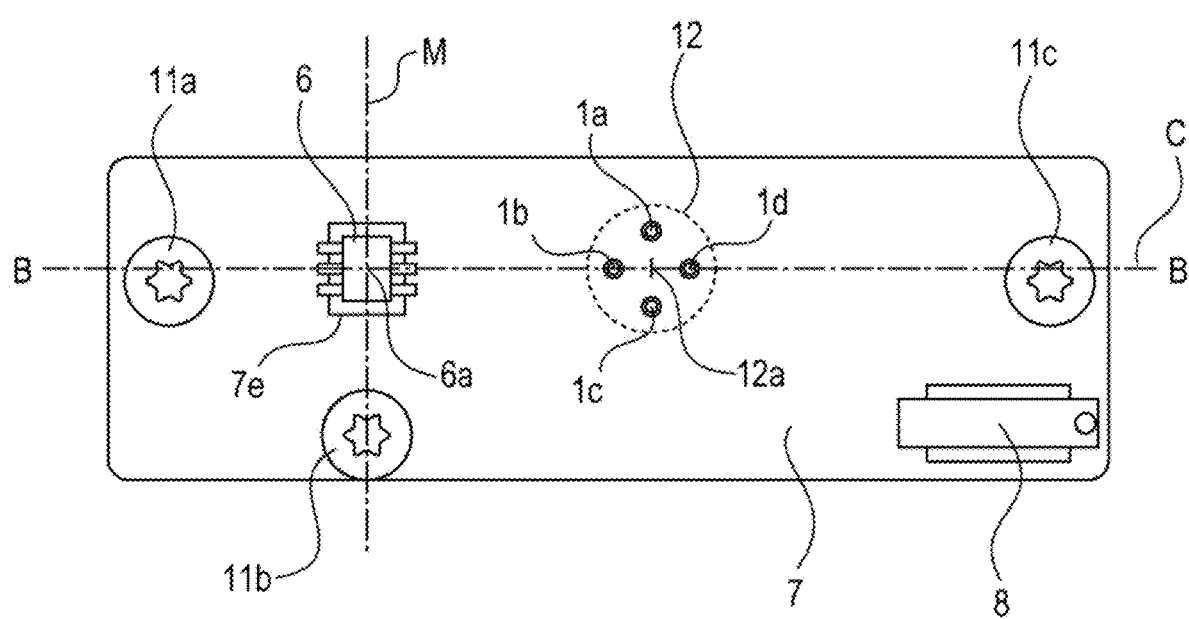
FIG. 3 is an explanatory side view for illustrating a positional relationship among a control circuit board, a BD sensor, and fixing screws in a first embodiment.
Figure 4:
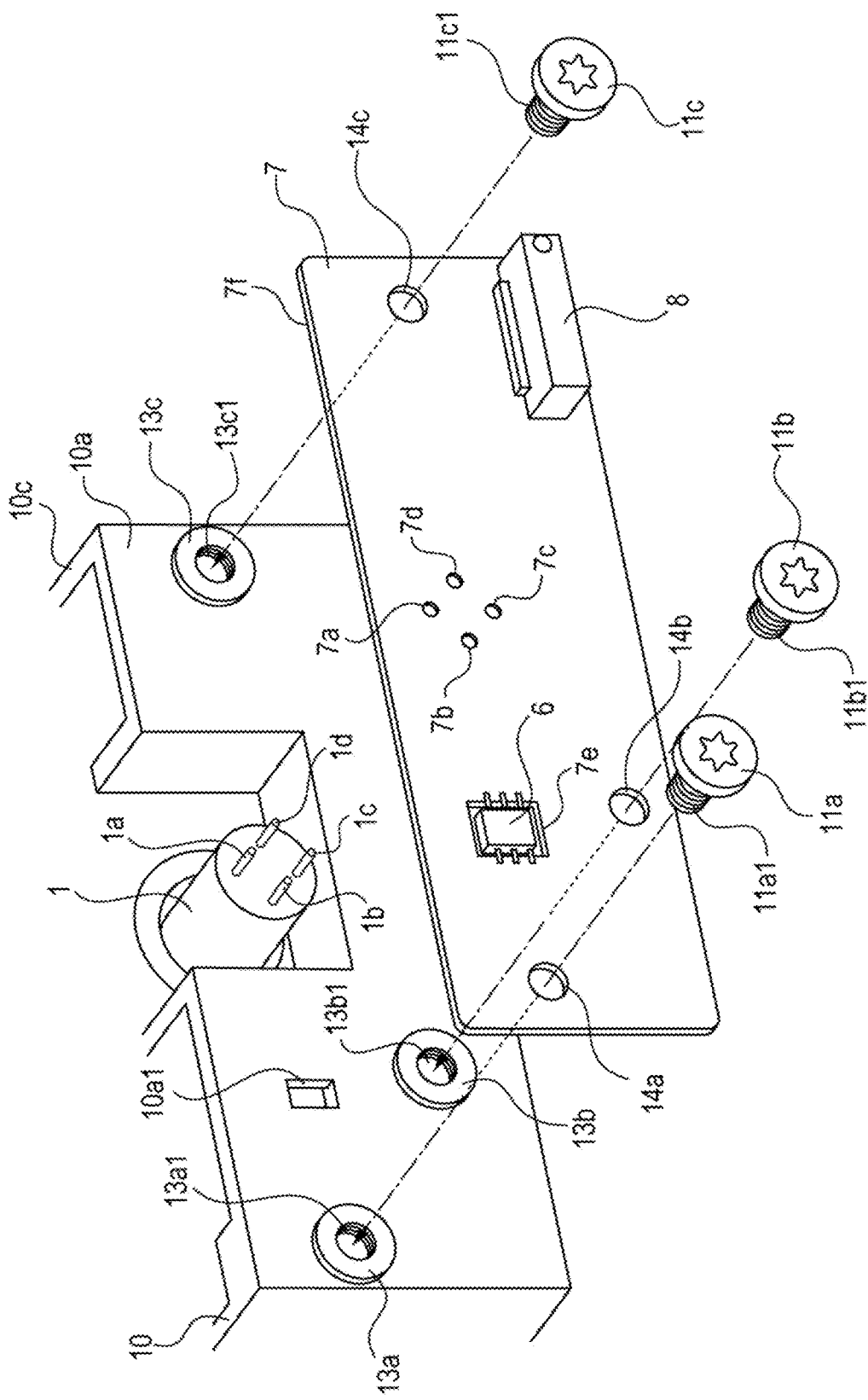
FIG. 4 is an exploded perspective view for illustrating a positional relationship among the control circuit board, an optical box, and the fixing screws in the first embodiment.

Next, a positional relationship among the control circuit board 7, the BD sensor 6, and the fixing screws 11a to 11c in this embodiment is described with reference to FIG. 3 and FIG. 4. FIG. 3 is an explanatory side view for illustrating the positional relationship among the control circuit board 7, the BD sensor 6, and the fixing screws 11a to 11c in this embodiment. FIG. 4 is an exploded perspective view for illustrating a positional relationship among the control circuit board 7, the optical box 10, and the fixing screws 11a to 11c in this embodiment. As the control circuit board 7 illustrated in FIG. 3 and FIG. 4, a one-sided circuit board made of a paper phenolic resin is used. The circuit board made of a paper phenolic resin is formed by impregnating a paper sheet made of an insulating material with a phenolic resin, and is also called "Bakelite board". Although the one-sided circuit board is adopted as the control circuit board 7 in this embodiment, the control circuit board 7 may be a double-sided circuit board.

As a material of the control circuit board 7, a glass epoxy resin may also be adopted. In this embodiment, the paper phenolic resin is adopted as the material of the control circuit board 7, thereby enabling reduction in cost. The control circuit board 7 made of the paper phenolic resin is manufactured at lower cost than the control circuit board 7 made of the glass epoxy resin. However, the control circuit board 7 made of the paper phenolic resin has low mechanical strength and is liable to be warped. Onto a mounting surface of the control circuit board 7 for electronic components, a laser driver (not shown) is mounted together with the BD sensor 6. The electronic components described above are soldered and fixed onto the control circuit board 7 through reflow soldering. The reflow soldering which involves a process of applying solder in advance at a normal temperature and then heating and melting the solder.

As the semiconductor laser unit 1, a two-beam laser configured to emit light beams from two light emission points is adopted. As illustrated in FIG. 4, four terminals 1a, 1b, 1c, and 1d of the semiconductor laser unit 1 are inserted into through holes 7a, 7b, 7c, and 7d formed in the control circuit board 7, respectively. The terminals 1a to 1d are rendered electrically conductive and connected with the solder at four positions on an electric circuit formed on a connection region 12 of the control circuit board 7 illustrated in FIG. 3. In FIG. 3, the connection region 12 indicated by the broken line corresponds to a circle formed by projecting an outer diameter of a cylindrical outer case of the semiconductor laser unit 1 (light source) illustrated in FIG. 4.

As illustrated in FIG. 4, the control circuit board 7 is fixed to the fixing seats 13a, 13b, and 13c provided on the outer surface of the side wall 10a of the optical box 10. Specifically, the control circuit board 7 is fixed at three positions with the fixing screws 11a to 11c. The fixing screws 11a to 11c are inserted into through holes 14a, 14b, and 14c formed in the control circuit board 7. The fixing screws 11a and 11c are provided in the vicinity of a straight line C illustrated in FIG. 3. The straight line C is parallel to a surface of the opening 10c of the optical box 10 and passes through a central position 6a of the BD sensor 6. The fixing screw 11b is arranged on a straight line M. The straight line M is orthogonal to the straight line C and passes through the central position 6a of the BD sensor 6. The straight line C illustrated in FIG. 3 is also a straight line for connecting the central position 6a of the BD sensor 6 and a central position 12a of the connection region 12 for the semiconductor laser unit 1.

In this embodiment, at least one fixing screw of the three fixing screws 11a to 11c (fixing unit), specifically, the fixing screw 11b, is arranged at the following position. The fixing screw 11b is arranged on the straight line M (second straight line). The straight line M is orthogonal to the straight line C (first straight line) and passes through the BD sensor 6 (detector) fixed onto the control circuit board 7. The straight line C connects the semiconductor laser unit 1 (light source) and the BD sensor 6 (detector).

FIG. 4 is an illustration of the fixing seats 13a to 13c configured to fix the control circuit board 7 onto the outer surface of the side wall 10a of the optical box 10. The fixing seats 13a to 13c, each being partially projected, are provided on the outer surface of the side wall 10a of the optical box 10. Surfaces of the fixing seats 13a to 13c, which are to be brought into abutment against a back surface of the control circuit board 7, are flat surfaces. Female threaded holes 13a1, 13b1, and 13c1 are formed in centers of the fixing seats 13a to 13c, respectively.

The fixing screws 11a to 11c inserted into the through holes 14a to 14c of the control circuit board 7 threadably fasten male thread portions 11a1, 11b1, and 11c1 into the female threaded holes 13a1 to 13c1 formed in the fixing seats 13a to 13c, respectively. The male thread portions 11a1 to 11c1 are formed on shank portions of the fixing screws 11a to 11c. In this manner, the control circuit board 7 is fixed to the fixing seats 13a to 13c with the fixing screws 11a to 11c.

The laser light beam L deflected and scanned by the rotary polygon mirror 4 is transmitted through a through hole 10a1 and a through hole 7e. The through hole 10a1 passes through the side wall 10a of the optical box 10, and the through hole 7e passes through the control circuit board 7. Then, the laser light beam L is incident on the light-receiving surface 61 of the BD sensor 6 mounted onto the control circuit board 7. The light-receiving surface 61 is arranged inside the through hole 7e of the control circuit board 7.

Figure 5:
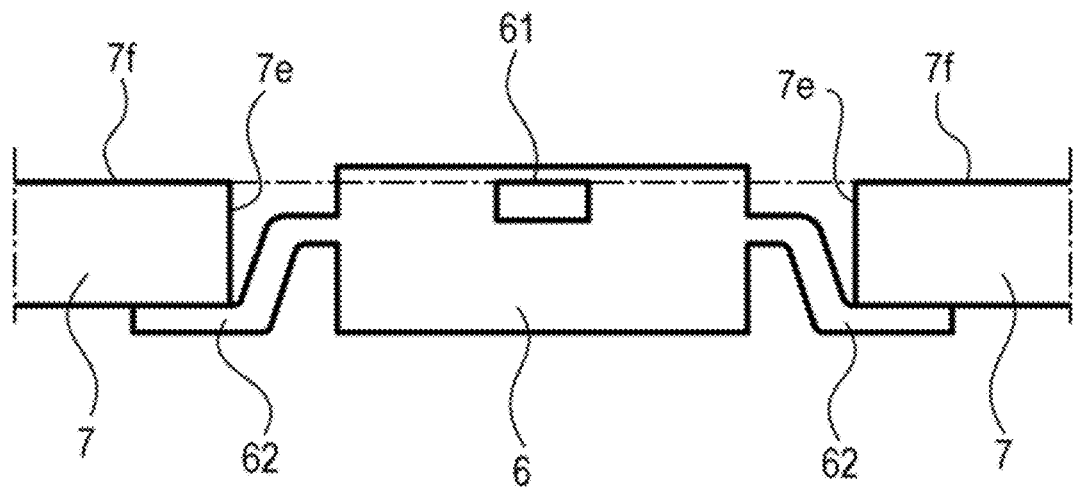
FIG. 5 is a sectional view for illustrating a positional relationship between a light-receiving surface of the BD sensor and the control circuit board in the first embodiment, which is taken along the line B-B of FIG. 3.

FIG. 5 is a sectional view for illustrating a positional relationship between the light-receiving surface 61 of the BD sensor 6 and the control circuit board 7 in this embodiment, which is taken along the line B-B of FIG. 3. When the laser light beam L is incident on the light-receiving surface 61 of the BD sensor 6 illustrated in FIG. 5, the BD sensor 6 generates the beam detect (BD) signal. The beam detect (BD) signal generated by the BD sensor 6 is transmitted to the control circuit board 7 through terminals 62. The light-receiving surface 61 of the BD sensor 6 is arranged so as to be approximately flush with a back surface 7f of the control circuit board 7, which is opposed to the outer surface of the side wall 10a of the optical box 10. When the laser light beam L is incident on a center of the light-receiving surface 61 of the BD sensor 6, the BD sensor 6 outputs the beam detect (BD) signal, which is then transmitted to the control circuit board 7 through the terminals 62.

Comparative Example

FIG. 6A, FIG. 6B, FIG. 6C, and FIG. 6D are illustrations of a comparative example in which the control circuit board 7 is fixed through only the fixing seats 13a and 13c provided on the outer surface of the side wall 10a of the optical box 10. Specifically, the fixing seat 13b is not used. FIG. 6A to FIG. 6D are explanatory sectional views for illustrating, under the above-mentioned state, the positional relationship between the BD sensor 6 and the optical box 10 depending on inclinations of the fixing seats 13a and 13c and warp of the control circuit board 7 for different inclinations of the fixing seats 13a and 13c.

The BD sensor 6 is hidden in the control circuit board 7, and therefore is schematically illustrated in FIG. 6A to FIG. 6D. The optical box 10 is manufactured by injection molding of a resin. The fixing seats 13a and 13c sometimes have inclinations due to a variation at the time of manufacture. The warp of the control circuit board 7 is classified into four types illustrated in FIG. 6A to FIG. 6D based on inclined states of the fixing seats 13a and 13c, which are illustrated in FIG. 6A to FIG. 6D.

Figure 6A:
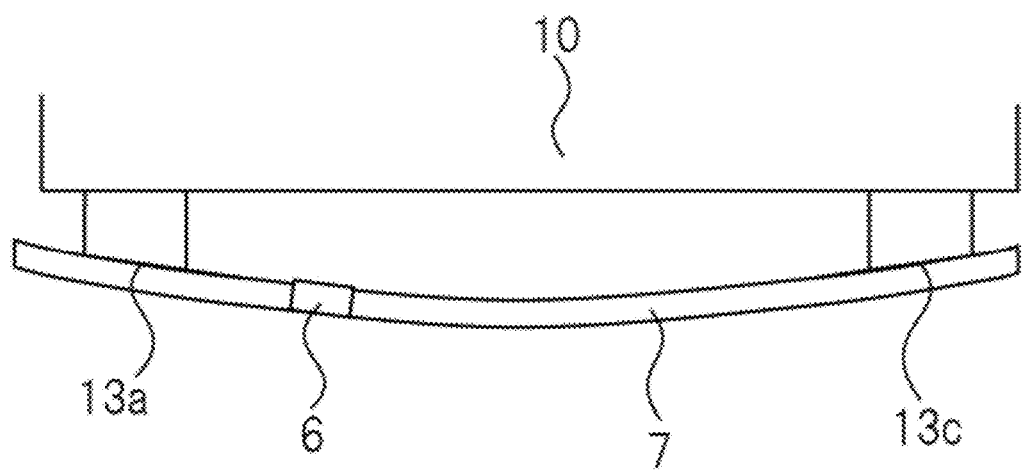
FIG. 6A is an explanatory sectional view of a comparative example in which the control circuit board is fixed through only two fixing seats.
Figure 6B:
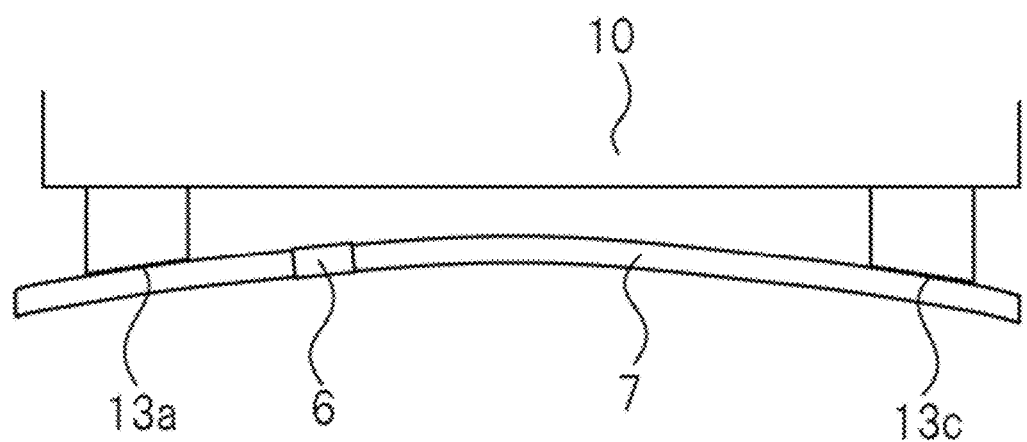
FIG. 6B is an explanatory sectional view of the comparative example in which the control circuit board is fixed through the only two fixing seats.
Figure 6C:
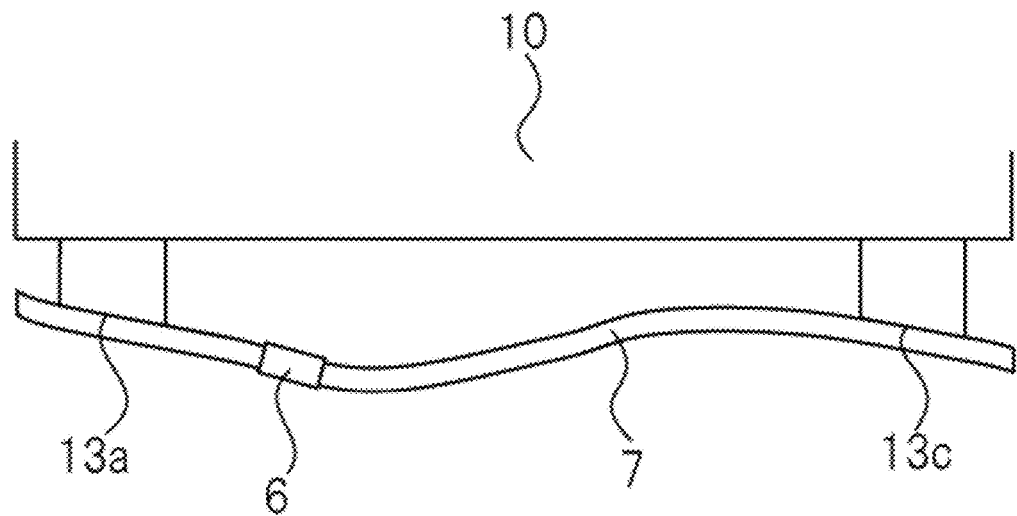
FIG. 6C is an explanatory sectional view of the comparative example in which the control circuit board is fixed through the only two fixing seats.
Figure 6D:
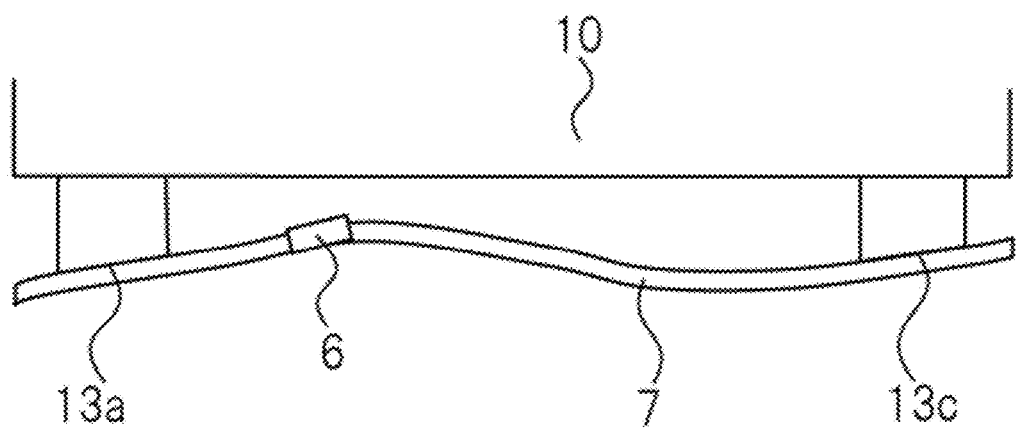
FIG. 6D is an explanatory sectional view of the comparative example in which the control circuit board is fixed through the only two fixing seats.

Under the inclined states of the fixing seats 13a and 13c, which are illustrated in FIG. 6A and FIG. 6C, a portion of the control circuit board 7, at which the BD sensor 6 is provided, is warped in an outwardly projecting manner. Therefore, the BD sensor 6 is in a state of being located away from the outer surface of the side wall 10a of the optical box 10. Under the inclined states of the fixing seats 13a and 13c, which are illustrated in FIG. 6B and FIG. 6D, the portion of the control circuit board 7, at which the BD sensor 6 is provided, is warped in an inwardly projecting manner. Therefore, the BD sensor 6 is in a state of being located close to the outer surface of the side wall 10a of the optical box 10.

Specifically, in the cases of FIG. 6A and FIG. 6C, an optical path length of the laser light beam L that is incident on the light-receiving surface 61 of the BD sensor 6 becomes longer than a normal optical path length. In the cases of FIG. 6B and FIG. 6D, the optical path length of the laser light beam L that is incident on the light-receiving surface 61 of the BD sensor 6 becomes shorter than the normal optical path length.

Figure 7A:
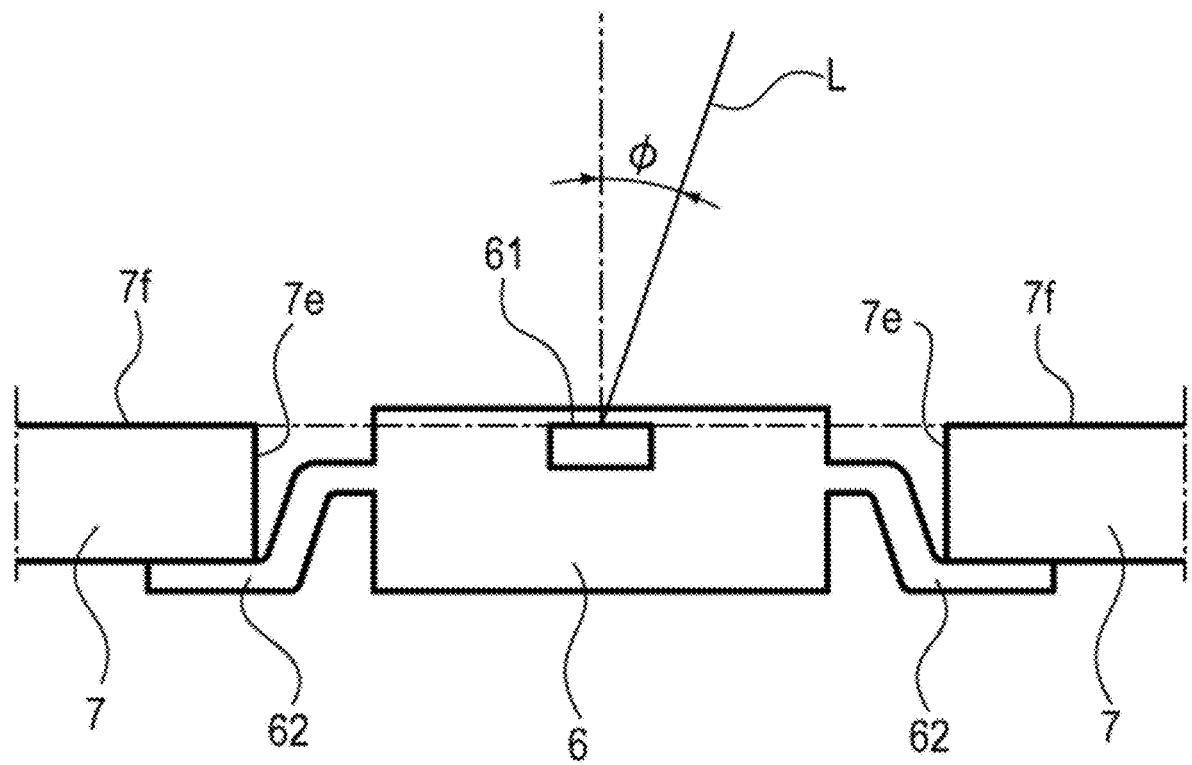
FIG. 7A is a sectional view for illustrating a positional relationship between the light-receiving surface of the BD sensor and a laser light beam incident on the light-receiving surface, which is taken along the line B-B of FIG. 3.

FIG. 7A is a sectional view for illustrating a positional relationship between the light-receiving surface 61 of the BD sensor 6 and the laser light beam L incident on the light-receiving surface 61, which is taken along the line B-B of FIG. 3. As illustrated in FIG. 7A, the laser light beam L is set so as to be incident on the light-receiving surface 61 of the BD sensor 6 at an incident angle φ larger than 0 degrees with respect to a normal direction (vertical direction) of the light-receiving surface 61.

The reason why the above-mentioned incident angle φ is set is as follows. When the normal direction of the light-receiving surface 61 of the BD sensor 6 and a direction in which the laser light beam L is incident match each other, part of the laser light beam L is reflected on the surface of the BD sensor 6. The reflected light returns to the semiconductor laser unit 1 being the light source to generate return light noise. The return light noise hinders stable laser oscillation. The incident angle φ is set as described above to prevent the return light noise.

Figure 7B:
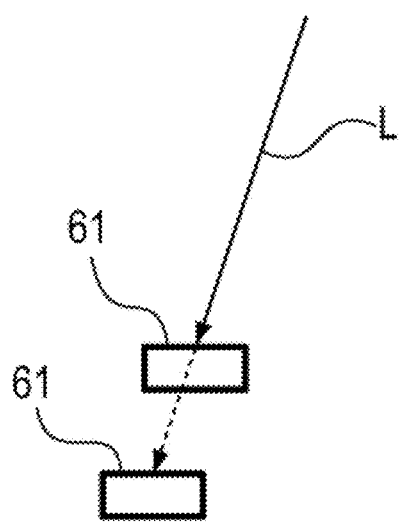
FIG. 7B is a view for illustrating the positional relationship between the light-receiving surface of the BD sensor and the laser light beam when the light-receiving surface is moved due to inclinations of the fixing seats and warp of the control circuit board.
Figure 7C:
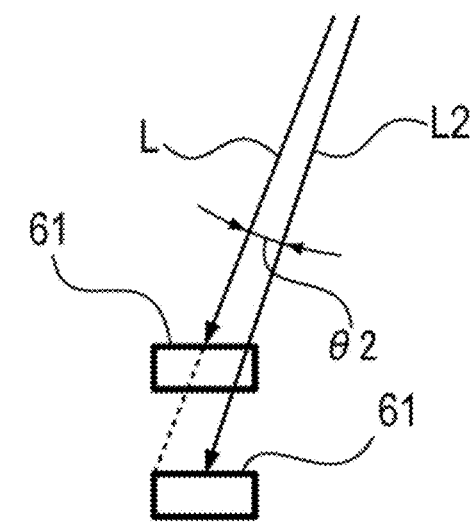
FIG. 7C is a view for illustrating the positional relationship between the light-receiving surface of the BD sensor and the laser light beam when the light-receiving surface is moved due to the inclinations of the fixing seats and the warp of the control circuit board.

Now, a shift of a position of the light-receiving surface 61 of the BD sensor 6, which is caused by the inclinations of the fixing seats 13a and 13c and the warp of the control circuit board 7 as illustrated in FIG. 6A to FIG. 6D, from a normal position is described with reference to FIG. 7B and FIG. 7C. FIG. 7B and FIG. 7C are views for illustrating the positional relationship between the light-receiving surface 61 of the BD sensor 6 and the laser light beam L when the position of the light-receiving surface 61 is shifted from the normal position due to the inclinations of the fixing seats 13a and 13c and the warp of the control circuit board 7.

FIG. 7B is an illustration of a case in which the position of the light-receiving surface 61 of the BD sensor 6 is shifted from the normal position to a position on an extension line in an optical axis direction of the laser light beam L. In the case illustrated in FIG. 7B, timing at which the laser light beam L is incident on the light-receiving surface 61 of the BD sensor 6 remains unchanged. Therefore, the writing start position is not shifted.

FIG. 7C is an illustration of a case in which the position of the light-receiving surface 61 of the BD sensor 6 is shifted from the normal position to a position that is offset from the optical axis direction of the laser light beam L. In the case illustrated in FIG. 7C, as timing at which the laser light beam L is incident on the light-receiving surface 61 of the BD sensor 6, in place of the laser light beam L at the normal position, a laser light beam L2, which is offset from the optical axis direction of the laser light beam L by an angle θ2, is incident on the light-receiving surface 61 of the BD sensor 6.

Therefore, detection timing of the laser light beam L2 incident on the light-receiving surface 61 of the BD sensor 6 is advanced by time corresponding to the angle θ2. As a result, the writing start position is shifted. When the writing start position is shifted, the writing start position on an image is shifted. As a result, a margin on the image printed on the recording material P is shifted. As illustrated in FIG. 7C, when the laser light beam L is shifted from the normal position of the laser light beam L in the optical axis direction of the laser light beam L to an upstream side in the scanning direction of the laser light beam L by the angle θ2, the writing start timing for the image is advanced. Thus, the margin on the image printed on the recording material P is reduced on a writing start side.

Figure 8A:
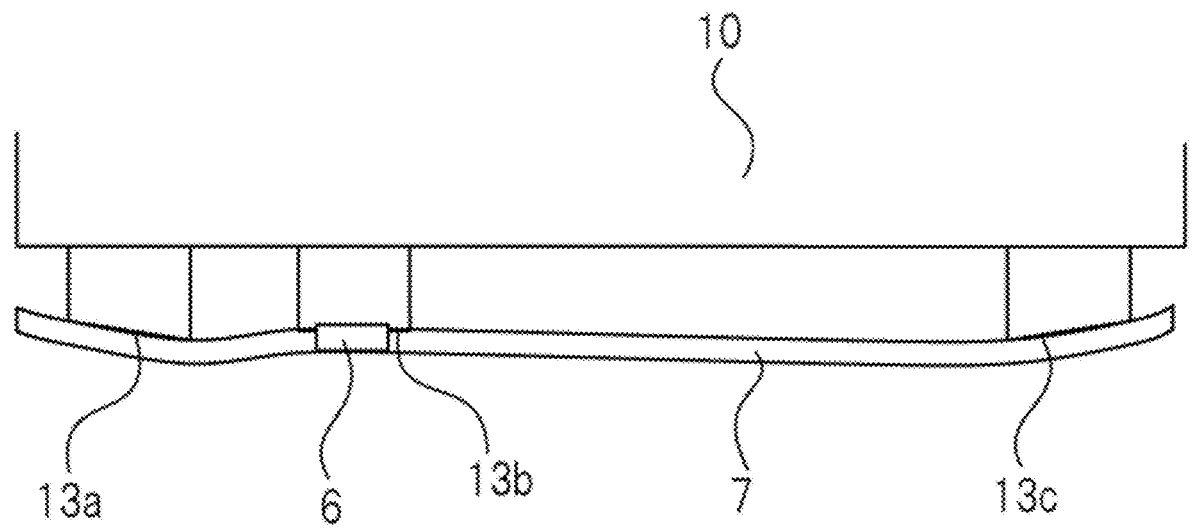
FIG. 8A is an explanatory sectional view for illustrating a positional relationship between the BD sensor and the optical box in a case in which one additional fixing seat provided at another position on an outer surface of a side wall of the optical box is not inclined when the control circuit board in a warped state illustrated in FIG. 6A is fixed to the one additional fixing seat in the first embodiment.
Figure 8B:
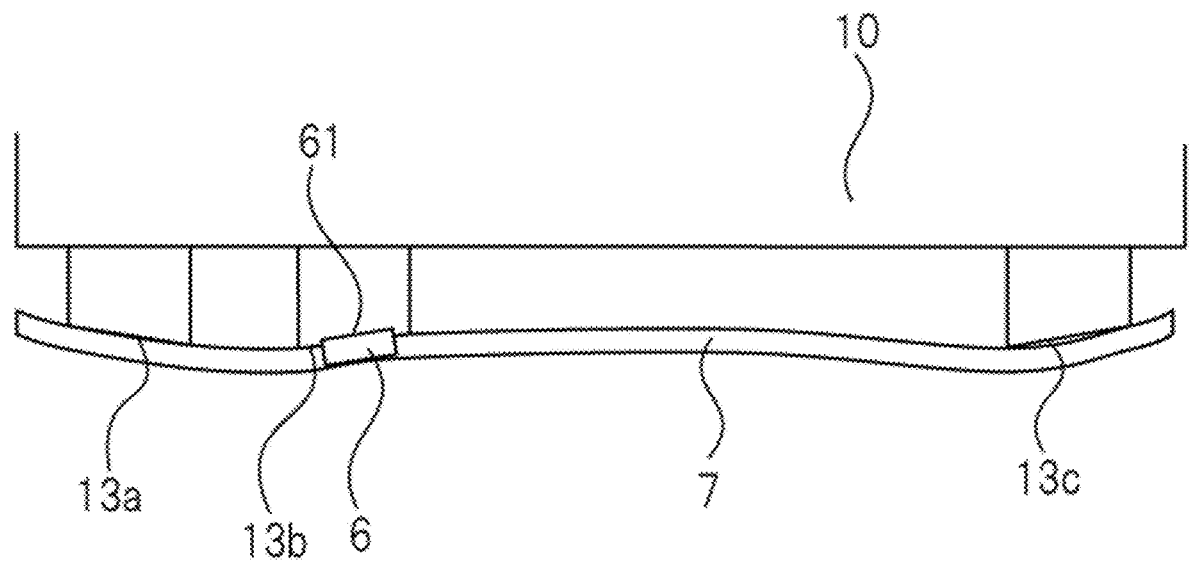
FIG. 8B is an explanatory sectional view for illustrating a positional relationship between the BD sensor and the optical box in a case in which the one additional fixing seat provided at the another position on the outer surface of the side wall of the optical box is not inclined when the control circuit board in the warped state illustrated in FIG. 6A is fixed to the one additional fixing seat in the first embodiment.

FIG. 8A and FIG. 8B are explanatory sectional views for illustrating a positional relationship between the BD sensor 6 and the optical box 10 when the control circuit board 7 in a warped state illustrated in FIG. 6A is fixed additionally through the fixing seat 13b provided on the outer surface of the side wall 10a of the optical box 10. FIG. 8A is an illustration of a case in which the fixing seat 13b is not inclined. FIG. 8B is an illustration of a case in which the fixing seat 13b is inclined.

The fixing seat 13b and the BD sensor 6 are arranged on the same plane (on the straight line M of FIG. 3) orthogonal to the scanning direction of the laser light beam L (direction indicated by the arrow A of FIG. 2). As a result, under a state in which the warp occurs in the control circuit board 7 fixed through the fixing seats 13a and 13c as illustrated in FIG. 6A, the control circuit board 7 is fixed additionally through the fixing seat 13b. Then, even when the control circuit board 7 is warped, the BD sensor 6 is fixed at a position on the straight line M of FIG. 3, at which the fixing seat 13b is arranged, without being affected by the warp.

Further, as illustrated in FIG. 8B, even when the fixing seat 13b is inclined, the light-receiving surface 61 of the BD sensor 6 is arranged so as to be approximately flush with the back surface 7f of the control circuit board 7 as illustrated in FIG. 5. Thus, the position on the light-receiving surface 61, at which the laser light beam L is received, scarcely changes. As a result, the shift of the position of the BD sensor 6 configured to generate the horizontal synchronization signal, which may be caused by the influence of the warp of the control circuit board 7, can be suppressed so as to prevent the shift of the timing at which the horizontal synchronization signal for controlling the image writing start position is generated. In this manner, the image with the stable image writing start position can be formed.

Second Embodiment

Figure 9:
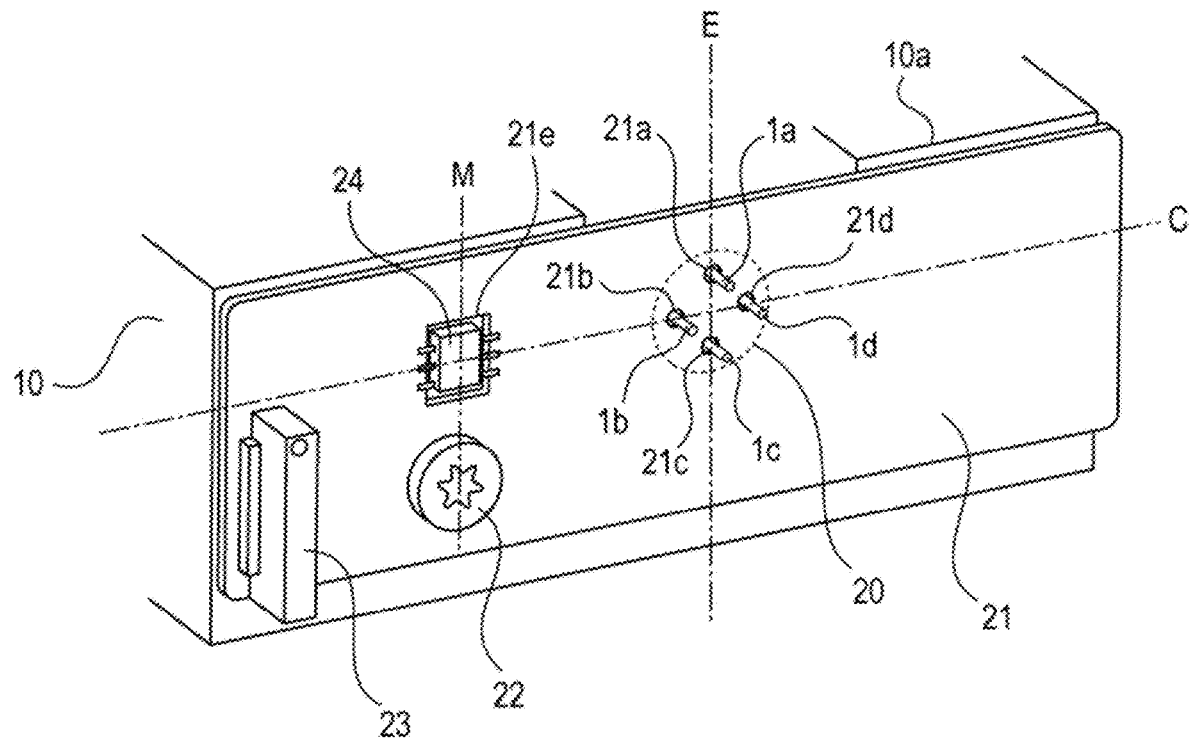
FIG. 9 is an explanatory perspective view for illustrating a positional relationship among a semiconductor laser unit, a connection region configured to fix the semiconductor laser unit provided on the control circuit board, a signal transmission connector, and a fixing screw in a second embodiment.

Next, a configuration of an image forming apparatus including an optical scanning apparatus according to a second embodiment of the present invention is described with reference to FIG. 9. Components having the same configurations as those in the first embodiment are denoted by the same reference symbols or are denoted by the same component names though different reference symbols are used, and therefore description thereof is herein omitted. FIG. 9 is an explanatory perspective view for illustrating a positional relationship among the semiconductor laser unit 1, a connection region 20 of a control circuit board 21, onto which the semiconductor laser unit 1 is to be fixed, a signal transmission connector 23, and a fixing screw 22 in the second embodiment.

In the first embodiment, as illustrated in FIG. 2, the control circuit board 7 is fixed onto the outer surface of the side wall 10a of the optical box 10 with the three fixing screws 11a to 11c. The signal transmission connector 8 corresponds to an example in which the signal transmission connector 8 is provided below the fixing screw 11c so that a longitudinal direction thereof is oriented horizontally. In the second embodiment, as illustrated in FIG. 9, the control circuit board 7 is fixed onto the outer surface of the side wall 10a of the optical box 10 with the one fixing screw 22. Further, the signal transmission connector 23 corresponds to an example in which the signal transmission connector 23 is provided on the left of the fixing screw 22 so that a longitudinal direction thereof is oriented vertically. With reference to FIG. 9, a positional relationship among the signal transmission connector 23, a beam detect (BD) sensor 24, and the fixing screw 22 in the second embodiment is described.

As illustrated in FIG. 9, the four terminals 1a to 1d of the semiconductor laser unit 1 being the light source are inserted into four through holes formed in the control circuit board 21, respectively. The terminals 1a to 1d are rendered electrically conductive and connected with the solder at four positions on an electric circuit formed on the connection region 20 of the control circuit board 21. The connection region 20 corresponds to a first connection portion at which the semiconductor laser unit 1 (light source) is connected to the control circuit board 21.

In the first embodiment illustrated in FIG. 2, the control circuit board 7 is fixed to the fixing seats 13a to 13c provided on the outer surface of the side wall 10a of the optical box 10 with use of the three fixing screws 11a to 11c. In the second embodiment illustrated in FIG. 9, the control circuit board 21 is fixed to a fixing seat (not shown) provided on the outer surface of the side wall 10a of the optical box 10 with use of the one fixing screw 22 so as to reduce cost.

The fixing screw 22 of the second embodiment is arranged at a position corresponding to the fixing screw 11b of the first embodiment, which is illustrated in FIG. 2. In the second embodiment, the one fixing screw 22 (fixing unit) is arranged at the following position. The fixing screw 22 is arranged on the straight line M (second straight line). The straight line M is orthogonal to the straight line C (first straight line) and passes through the BD sensor 24 (detector) fixed onto the control circuit board 21. The straight line C connects the semiconductor laser unit 1 (light source) and the BD sensor 24 (detector).

The signal transmission connector 23 illustrated in FIG. 9 corresponds to a second connection portion through which the control circuit board 21 and an exterior are electrically connected to each other. The signal transmission connector 23 (second connection portion) is arranged on the BD sensor 24 side (the detector side) of a straight line E (fourth straight line). The straight line E is orthogonal to the straight line C (first straight line) and passes through the semiconductor laser unit 1 (light source). The signal transmission connector 23 and the exterior are electrically connected to each other with use of bundled wires (not shown). When the bundled wires to be removably connected to the signal transmission connector 23 are removed and inserted, a force is applied to the control circuit board 21 to deform the control circuit board 21.

As described above with reference to FIG. 4, the four terminals 1a to 1d of the semiconductor laser unit 1 are inserted into through holes 21a, 21b, 21c, and 21d formed in the control circuit board 21, respectively. Then, the terminals 1a to 1d are rendered electrically conductive and connected with the solder at four positions on the electric circuit formed on the connection region 20 of the control circuit board 21 illustrated in FIG. 9.

In this manner, the control circuit board 21 and the semiconductor laser unit 1 are fixed with the solder. Therefore, when the control circuit board 21 is deformed, a force of the deformation is also applied to the solder provided on the connection region 20. When the force is applied to the solder provided on the connection region 20, peeling is sometimes caused on a connection surface of the control circuit board 21 with the electric circuit.

In the second embodiment, in order to reduce the influence of the force on the solder provided on the connection region 20, the fixing screw 22 (fixing unit) is arranged between the connection region 20 (first connection portion) and the signal transmission connector 23 (second connection portion). In this manner, the solder provided on the connection region 20 of the semiconductor laser unit 1 is less liable to be affected by the deformation of the control circuit board 21, which is caused by the insertion and removal of the bundled wires into and from the signal transmission connector 23.

Also in the second embodiment, the laser light beam L deflected and scanned by the rotary polygon mirror 4 is transmitted through the through hole 10a1 and a through hole 21e. The through hole 10a1 passes through the side wall 10a of the optical box 10, and the through hole 21e passes through the control circuit board 21. Then, the laser light beam L is incident on the light-receiving surface 61 of the BD sensor 24 mounted onto the control circuit board 21. The light-receiving surface 61 is arranged inside the through hole 21e of the control circuit board 21. In the second embodiment, the shift of the position of the BD sensor 24, which may be caused by the influence of the warp of the control circuit board 21, is suppressed with a more inexpensive configuration than that of the first embodiment. Thus, the timing at which the horizontal synchronization signal for controlling the image writing start position is generated can be prevented from being advanced or delayed.

Figure 10:
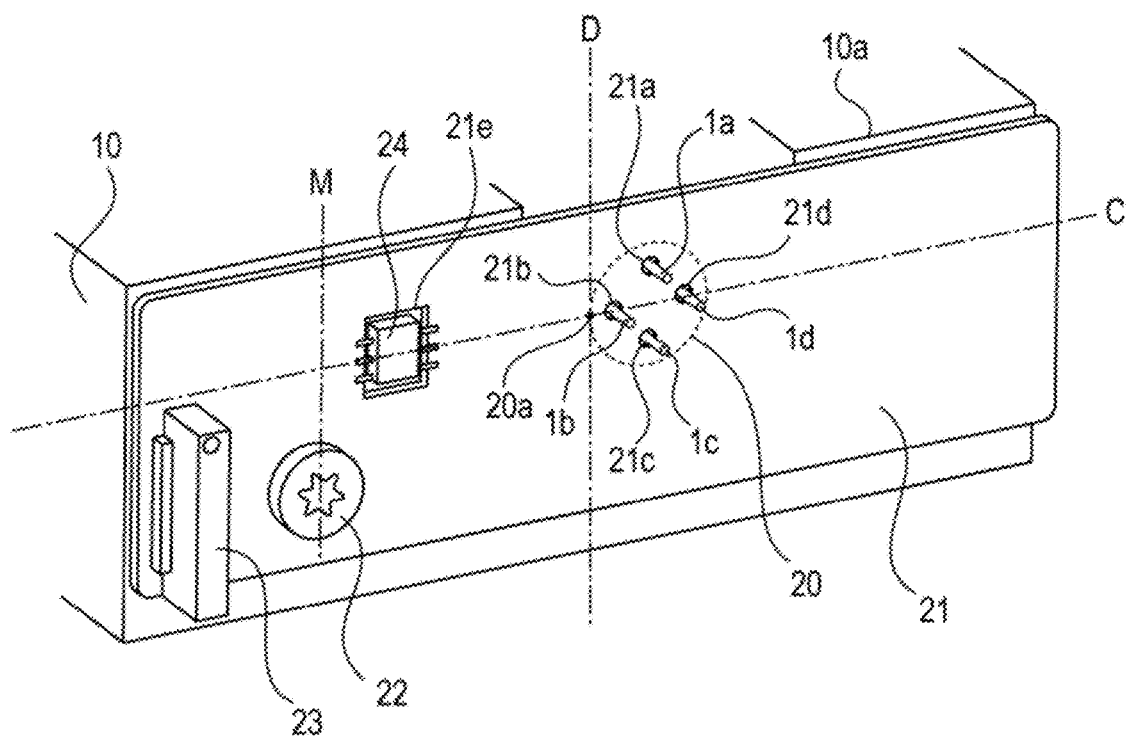
FIG. 10 is an explanatory perspective view for illustrating another configuration of the second embodiment.

FIG. 10 is an explanatory perspective view for illustrating another configuration of the second embodiment. As illustrated in FIG. 10, the control circuit board 21 is fixed onto the side wall 10a of the optical box 10 with the fixing screw 22 being one fixing unit. The fixing screw 22 is arranged on the straight line M (second straight line). The straight line M is orthogonal to the straight line C (first straight line) for connecting the semiconductor laser unit 1 (light source) and the BD sensor 24 (detector). Now, a straight line D (third straight line) is considered. The straight line D passes through an end 20a of the semiconductor laser unit 1 (light source), which is located on the side closer to the BD sensor 24 (side closer to the detector) and is parallel to the straight line M (second straight line). The fixing screw 22 (fixing unit) is arranged on the BD sensor 24 side (on the detector side) of the straight line D.

The fixing screw 22 (fixing unit) is arranged between the signal transmission connector 23 and the BD sensor 24 (detector). Through the signal transmission connector 23, the control circuit board 21 and the exterior are electrically connected to each other. The fixing screw 22 (fixing unit) is arranged on the BD sensor 24 side of the signal transmission connector 23. In FIG. 10, the fixing screw 22 (fixing unit) is provided at the position farther away from the semiconductor laser unit 1 (light source) than the BD sensor 24 (detector). However, the position of the fixing screw 22 is not limited to that in a mode illustrated in FIG. 10.

Figure 11:
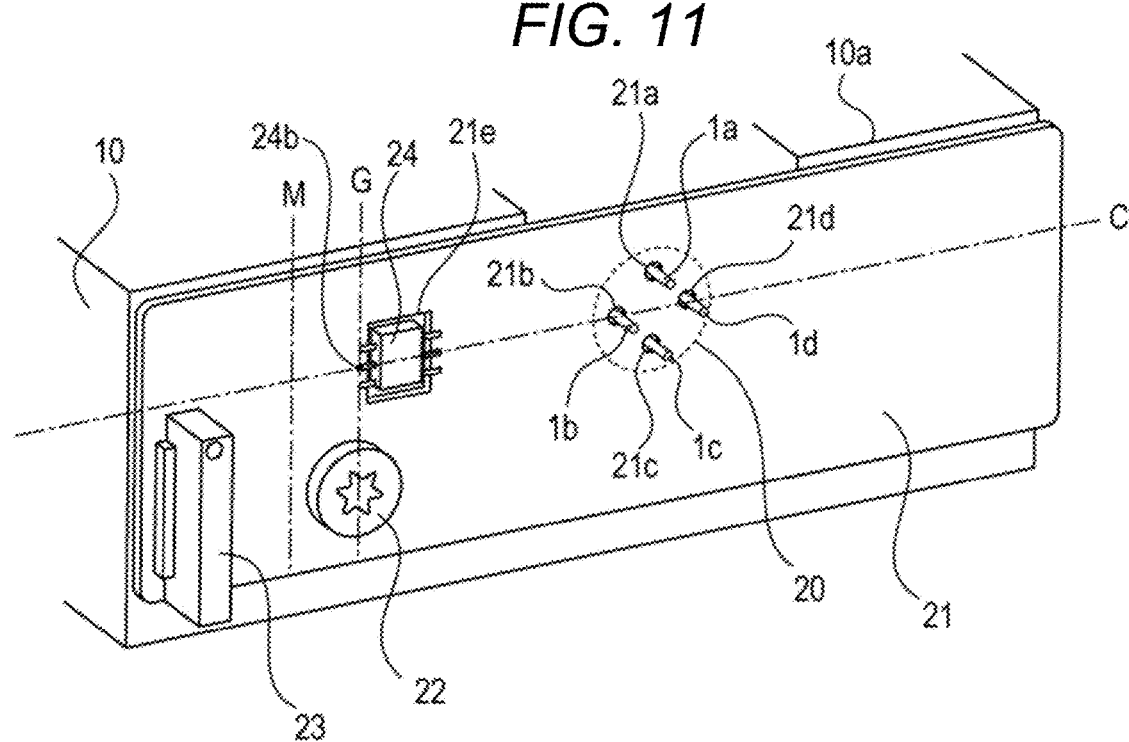
FIG. 11 is an explanatory perspective view for illustrating still another configuration of the second embodiment.

For example, as illustrated in FIG. 11, the straight line M (second straight line) that is orthogonal to the straight line C (first straight line) is considered. The straight line C connects the semiconductor laser unit 1 (light source) and the BD sensor 24 (detector). Then, a straight line G (fifth straight line) that is parallel to the straight line M and passes through an end 24*b* of the BD sensor 24 (detector), which is the farthest end from the semiconductor laser unit 1 (light source), is considered. The fixing screw 22 (fixing unit) may be arranged on the straight line G. In FIG. 10 and FIG. 11, the connection region 20 indicated by the broken line corresponds to a circle formed by projecting the outer diameter of the cylindrical outer case of the semiconductor laser unit 1 (light source) onto the control circuit board 21. Other configurations are the same as those of the first embodiment, and the same effects may be obtained.

Third Embodiment

Figure 12:
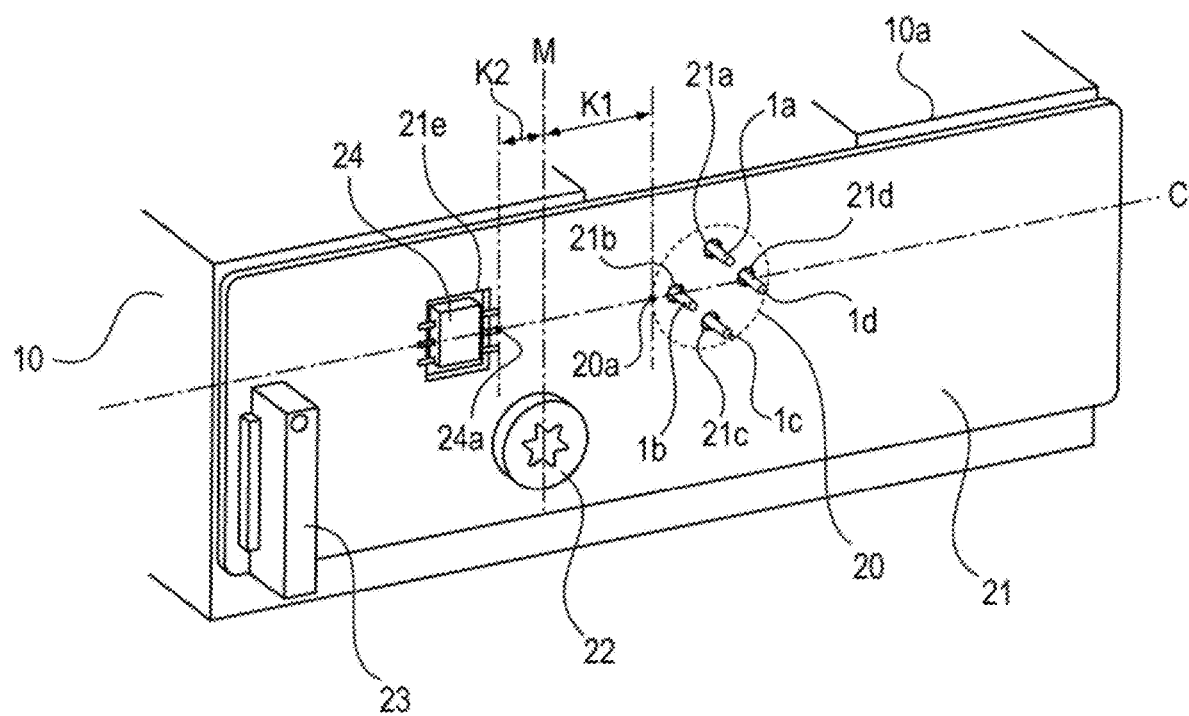
FIG. 12 is an explanatory perspective view for illustrating a configuration of a third embodiment.

FIG. 12 is an explanatory perspective view for illustrating another configuration of a third embodiment. As illustrated in FIG. 12, the control circuit board 21 is fixed onto the side wall 10*a* of the optical box 10 with the fixing screw 22 being one fixing unit. The fixing screw 22 is arranged on the straight line M (second straight line). The straight line M is orthogonal to the straight line C (first straight line) for connecting the semiconductor laser unit 1 (light source) and the BD sensor 24 (detector). The fixing screw 22 (fixing unit) is arranged so as to be closer to the BD sensor 24 (the detector side) than to the semiconductor laser unit 1 (light source).

Now, a distance on the straight line C (first straight line) from the end 20*a* of the semiconductor laser unit 1 (light source), which is located on the side closer to the BD sensor 24 (side closer to the detector), to the straight line M is defined as K1. Further, a distance on the straight line C (first straight line) from an end 24*a* of the BD sensor 24 (the detector side), which is located on the side closer to the semiconductor laser unit 1 (side closer to the light source), to the straight line M is defined as K2. In this case, a relationship of {K2<K1} is established. In FIG. 12, the connection region 20 indicated by the broken line corresponds to a circle formed by projecting the outer diameter of the cylindrical outer case of the semiconductor laser unit 1 (light source) onto the control circuit board 21. Other configurations are the same as those of the first and second embodiments, and the same effects may be obtained.

According to the embodiments, there is provided an optical scanning apparatus capable of reliably and highly accurately positioning a detector configured to generate a horizontal synchronization signal on an optical box and forming an image with a stable image writing start position.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An optical scanning apparatus, comprising:
    a light source;
    a deflector including a rotary polygon mirror configured to deflect and scan a light beam emitted from the light source;
    a detection sensor for detecting a writing start position of the light beam reflected by the rotary polygon mirror;
    a control circuit board electrically connected to the light source; and
    an optical box configured to accommodate the deflector, wherein the detection sensor is fixed to the control circuit board,
    wherein the control circuit board includes a first connection portion at which the light source is connected to the control circuit board and a second connection portion through which the control circuit board and an exterior are electrically connected, and the control circuit board is fixed to the optical box by a fixing screw,
    wherein when looking at the control circuit board in a direction perpendicular to a plane of the control circuit board, the fixing screw is arranged between the first connection portion and the second connection portion, is arranged on a second straight line orthogonal to a first straight line connecting the light source and the detection sensor, and is arranged so as to be closer to the detection sensor than to the light source, and
    wherein the second straight line is a line that passes through the detection sensor or a line that is closer to the detection sensor than to the light source.

2. The optical scanning apparatus according to claim 1, wherein the control circuit board is attached to a side surface of the optical box.

3. The optical scanning apparatus according to claim 1, wherein a material of the control circuit board comprises a paper phenolic resin.

4. The optical scanning apparatus according to claim 1, wherein the second connection portion is arranged on a side of the detection sensor with respect to a fourth straight line that is orthogonal to the first straight line connecting the light source and the detection sensor and passes through the light source.

5. The optical scanning apparatus according to claim 1, wherein the fixing screw is arranged between a signal transmission connector through which the control circuit board and an exterior are electrically connected and the detection sensor.

6. The optical scanning apparatus according to claim 1, wherein the fixing screw is arranged on a fifth straight line that is parallel to the second straight line and passes through an end of the detection sensor which is a farthest end from the light source.

7. An image forming apparatus configured to form an image on a recording material, comprising:
    the optical scanning apparatus as recited in claim 1; and
    a photosensitive drum to be scanned by the light beam.

8. The optical scanning apparatus according to claim 1, wherein the second straight line passes through an end of the detection sensor farthest from the light source.

9. The optical scanning apparatus according to claim 1, wherein the fixing screw is arranged on a side of the detection sensor with respect to a third straight line that passes through an end of the light source, which is located on the side of the detection sensor, and is parallel to the second straight line.

* * * * *